US010402718B2

(12) United States Patent
Liden et al.

(10) Patent No.: US 10,402,718 B2
(45) Date of Patent: Sep. 3, 2019

(54) ASSIGNATION OF EMOTIONAL STATES TO COMPUTER-IMPLEMENTED ENTITIES

(71) Applicant: Microsoft Corporation, Redmond, WA (US)

(72) Inventors: Lars Liden, Seattle, WA (US); Kati London, New York, NY (US)

(73) Assignee: Microsoft Technology Licensing, LLC, Redmond, WA (US)

(*) Notice: Subject to any disclaimer, the term of this patent is extended or adjusted under 35 U.S.C. 154(b) by 600 days.

(21) Appl. No.: 14/194,803

(22) Filed: Mar. 2, 2014

(65) Prior Publication Data

US 2015/0248620 A1 Sep. 3, 2015

(51) Int. Cl.
*G06N 5/04* (2006.01)
*G06N 5/02* (2006.01)
*G06N 3/00* (2006.01)

(52) U.S. Cl.
CPC ............ *G06N 3/006* (2013.01); *G06N 5/02* (2013.01); *G06N 5/04* (2013.01)

(58) Field of Classification Search
CPC ........................................................ G06N 5/04
See application file for complete search history.

(56) References Cited

U.S. PATENT DOCUMENTS

| 8,442,849 B2 | 5/2013 | Kantak et al. |
| 8,589,407 B2 | 11/2013 | Bhatia |
| 2003/0028383 A1 | 2/2003 | Guerin et al. |
| 2008/0269958 A1* | 10/2008 | Filev ............... B60W 50/10 701/1 |
| 2013/0018837 A1 | 1/2013 | Lee |
| 2014/0040387 A1* | 2/2014 | Spivack ............. H04L 51/32 709/206 |

FOREIGN PATENT DOCUMENTS

WO WO 2007098560 A1 * 9/2007 ............. G06N 3/004

OTHER PUBLICATIONS

Gillies, M., et al. "Integrating autonomous behavior and user control for believable agents." Proceedings of the Third International Joint Conference on Autonomous Agents and Multiagent Systems—vol. 1. IEEE Computer Society, 2004.*

(Continued)

*Primary Examiner* — Eric Nilsson
(74) *Attorney, Agent, or Firm* — Medley, Behrens & Lewis, LLC

(57) ABSTRACT

Described herein are various technologies pertaining to assigning an emotional state to a computer-implemented entity. The emotional state is a function of data values in a data stream output by a data source, such as a sensor or a web service. The data values in the data stream are processed over time to generate a measure value. Values that are indicative of a dynamic state of a measure relative to an optimal measure state are computed and assigned to the measure based upon the measure value. A reaction of the computer-implemented entity is determined based upon these values. A customized personality for the computer-implemented entity maps reactions to respective emotional states, and an emotional state that is mapped to the reaction is assigned to the computer-implemented entity.

20 Claims, 11 Drawing Sheets

(56) References Cited

OTHER PUBLICATIONS

Banerjee, Soumya, et al. "Intrusion detection on sensor networks using emotional ants." International Journal of Applied Science and Computations 12.3 (2005): 152-173.*

Cleland, et al., "Mobile Based Prompted Labeling of Large Scale Activity Data", In Proceedings of 5th International Work-Conference, Dec. 2, 2013, 8 pages.

Hamm, et al., "Automatic Annotation of Daily Activity from Smartphone-based Multisensory Streams", In Proceedings of 4th International Conference on Mobile Computing, Applications and Services, Oct. 11, 2012, 15 pages.

Inanoglu, et al., "Emotive Alert: HMM-Based Emotion Detection in Voicemail Messages", In Proceedings of the 10th International Conference on Intelligent User Interfaces, Jan. 10, 2005, 3 pages.

Szewcyzk, et al., "Annotating Smart Environment Sensor Data for Activity Learning", In Journal of Technology and Health Care, vol. 17, Issue 3, Aug. 2009, 19 pages.

Yang, et al., "Mining in Anticipation for Concept Change: Proactive-Reactive Prediction in Data Streams", In Proceedings of 11th ACM Sigkdd International Conference on Knowledge Discovery and Data Mining, Aug. 21, 2005, 33 pages.

* cited by examiner

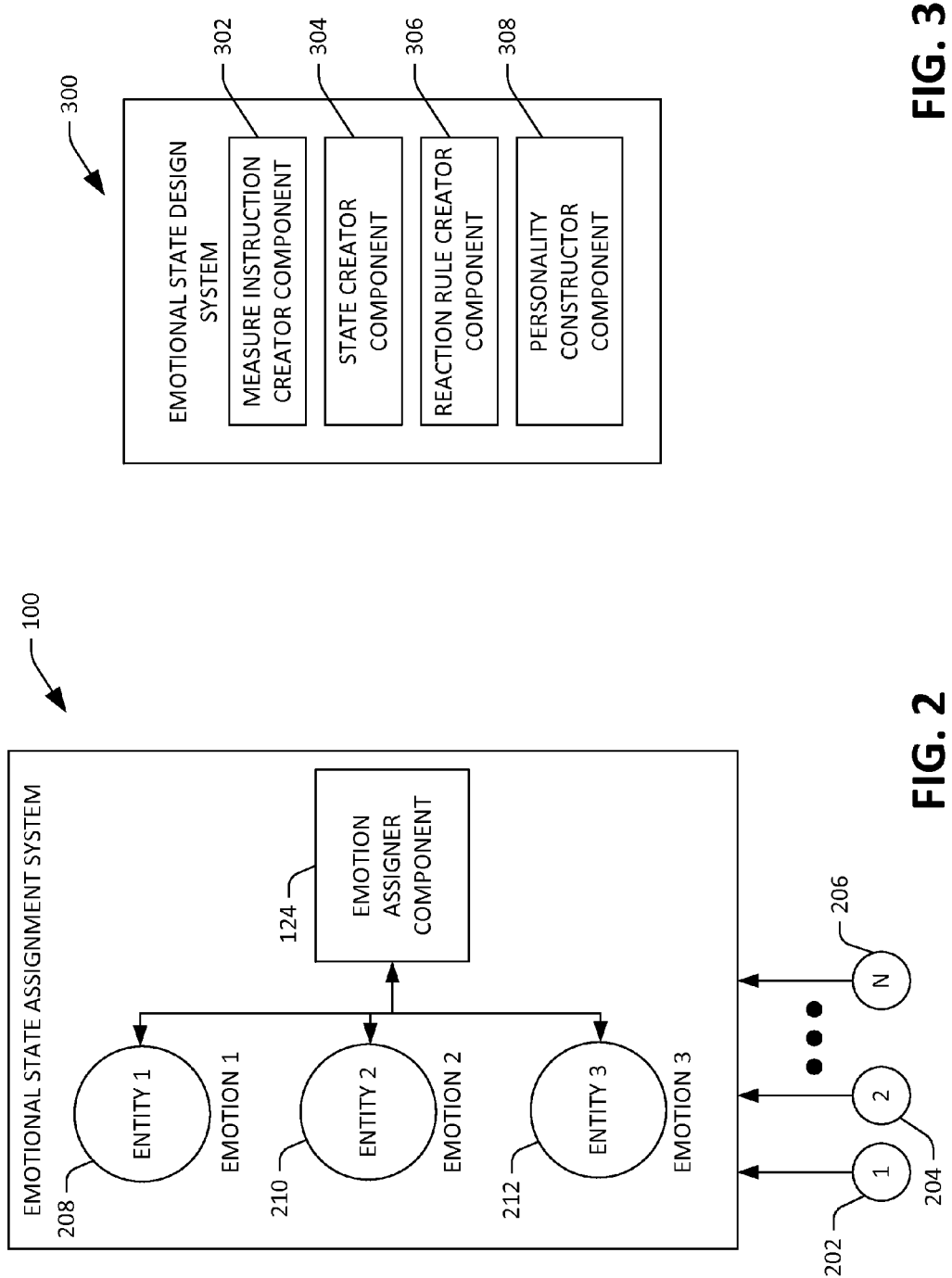

FIG. 4

| MEASURE NAME 402 | MIN 404 | MAX 406 | TYPE 408 | INT. RATE 410 | DECAY RATE 412 | ADD 414 |
|---|---|---|---|---|---|---|
| TEMPERATURE | 43 | 79 | CONTINUOUS ▶ | 30 | | DEL. 426 |
| RAINFALL | 0.015 | 0.21 | CONTINUOUS | 50 | | DEL. 428 |
| DRAIN OVERFLOW | 0 | 10 | EVENT-BASED | 3 | 0.1 | DEL. 430 |
| GRAFFITI | 1 | 3 | EVENT-BASED | 50 | 0.01 | DEL. 432 |
| POLICE REPORTS | 0 | 20 | EVENT-BASED | 25 | 0.4 | DEL. 434 |

400

416, 418, 420, 422, 424

ASSIGNATION OF EMOTIONAL STATES TO COMPUTER-IMPLEMENTED ENTITIES

BACKGROUND

Oftentimes, output of a computer system or sensor is difficult for a user to fully comprehend. For example, a sensor can be configured to continuously output values; however, one who is not familiar with the operation of the sensor may not be able to obtain any meaning from values output thereby. In an example, a carbon monoxide detector may be positioned in a home, and can output values that are indicative of levels of carbon monoxide in proximity to the sensor. A lay user, however, may not comprehend the meaning of such carbon monoxide values (e.g., unless an alarm is triggered). For example, without more information or education regarding carbon monoxide levels, the user may be unable to ascertain whether she should be alarmed, whether a particular action should be undertaken to attempt to remedy a potential carbon monoxide issue, etc.

SUMMARY

The following is a brief summary of subject matter that is described in greater detail herein. This summary is not intended to be limiting as to the scope of the claims.

Described herein are various technologies pertaining to the assignment of labels that are representative of respective human emotions to a computer-implemented entity based upon data values in a data stream. Also described herein are various technologies pertaining to a system that facilitates defining emotional responses of a computer-implemented entity to dynamic states of a data stream. In an exemplary embodiment, a computer-implemented entity can be representative of a physical or virtual entity. For example, with respect to physical entities, the computer-implemented entity can be representative of a person, a home, a street, a plant, a city, or the like. With respect to virtual entities, the computer-implemented entity can be representative of an idea, a group, a business, or the like.

The computer-implemented entity can be assigned an emotional state from a plurality of possible emotional states through execution of a multitude of acts. Initially, a set of "measure instructions" can be executed over an identified data stream, wherein a combination of the data stream and the measure instructions can be referred to herein as a "measure." The measure instructions can identify an integration rate and a decay rate, wherein the integration rate is indicative of a time duration of a time window during which data values are to be smoothed, and the decay rate is indicative of a rate of decay of a data value in the data stream with respect to time. Thus, for example, the integration rate can indicate that received data values in the data stream are to be averaged over a most recent two minute time window. The decay rate can be used for event-based data streams (where data values are not continuously (e.g., periodically) generated), which facilitates assignation of a (current) emotional state to the computer-implemented entity when a data value has not recently been received. Execution of the measure instructions over the data stream results in computation of a value, referred to herein as a "measure value".

Using the measure value, values for respective measure parameters of the measure can be computed, wherein the values are indicative of the dynamic state of the measure value relative to a predefined (e.g., desirable) measure state. For example, the values can be indicative of position of the measure value relative to the predefined measure state, direction of movement of the measure value relative to the predefined measure state, rate of the movement of the measure value, and/or the like. In an example, the aforementioned parameters can include a first parameter, a second parameter, and a third parameter. A value of the first parameter can be indicative of position of the measure value relative to the predefined measure state (e.g., "FAR ABOVE", "ABOVE", "SLIGHTLY ABOVE", "ON", "SLIGHTLY BELOW", "BELOW", or "FAR BELOW"), a value of the second parameter can be indicative of direction of movement of measure values relative to the predefined measure state (e.g., "AWAY", "TOWARD", or "STEADY"), and a value of the third parameter can be indicative of the rate of such movement (e.g., "VERY FAST", "FAST", "SLOW", "VERY SLOW", or "STEADY"). Thus, again, such measure parameter values are indicative of the dynamic state of the measure value relative to the predefined measure state.

At least one "reaction rule" can be selected from amongst a plurality of reaction rules based upon the combination of values of the respective measure parameters, wherein a reaction rule maps a parameter value combination to a particular reaction, which can then be assigned to the measure. For example, a first reaction rule can map the combination of parameter values "ABOVE", "AWAY", and "VERY FAST" to the reaction "REACTION 1", while a second reaction rule can map the combination of parameter values "ON", "STEADY", and "STEADY" with the reaction "REACTION 2". Alternatively, output of the reaction rule can map directly to an emotional state, such that the emotional state of the computer-implemented entity is defined by the reaction.

The computer-implemented entity can have a customized personality assigned thereto (e.g., a personality type), where the personality maps reactions to respective emotional states. Continuing with the example set forth above, the customized personality for the computer-implemented entity can map the reaction "REACTION 1" to the emotional state "CONCERNED", and can map the reaction "REACTION 2" to the emotional state "HAPPY". It can be ascertained that different personalities will include different mappings between reactions and emotional states. Further, exemplary emotional states that can be assigned to the computer-implemented entity can correlate to emotional states experienced by humans, such as "HAPPY", "SAD", "ANXIOUS", "CONCERNED", "BORED", "DEPRESSED", "AROUSED", "TIRED", "EXCITED", "SCARED", amongst others. Assignation of emotional states to a computer-implemented entity is advantageous over conventional systems that are configured to output numerical data values, as a human observer of the computer-implemented entity can intuitively understand an emotion expressed by the computer-implemented entity, and therefore may better understand when it is desirable to take action, when it is desirable to more closely monitor an entity represented by the computer-implemented entity, etc.

As indicated above, also described herein is a framework that facilitates designing a system that is configured to assign emotional states to a computer-implemented entity. For example, such framework can be configured to facilitate defining the measure instructions, defining the predefined measure state, defining mappings between measure parameter values and reactions, and defining personality types.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a functional block diagram of an exemplary system that facilitates assigning an emotional state to a computer-implemented entity based upon emotional states assigned to other computer-implemented entities.

FIG. 3 is a functional block diagram of an exemplary framework that facilitates configuring a system to assign emotional states to a computer-implemented entity.

FIG. 4 is an exemplary graphical user interface that facilitates creating measure instructions that can be applied to a data stream.

DETAILED DESCRIPTION

Figure 1:
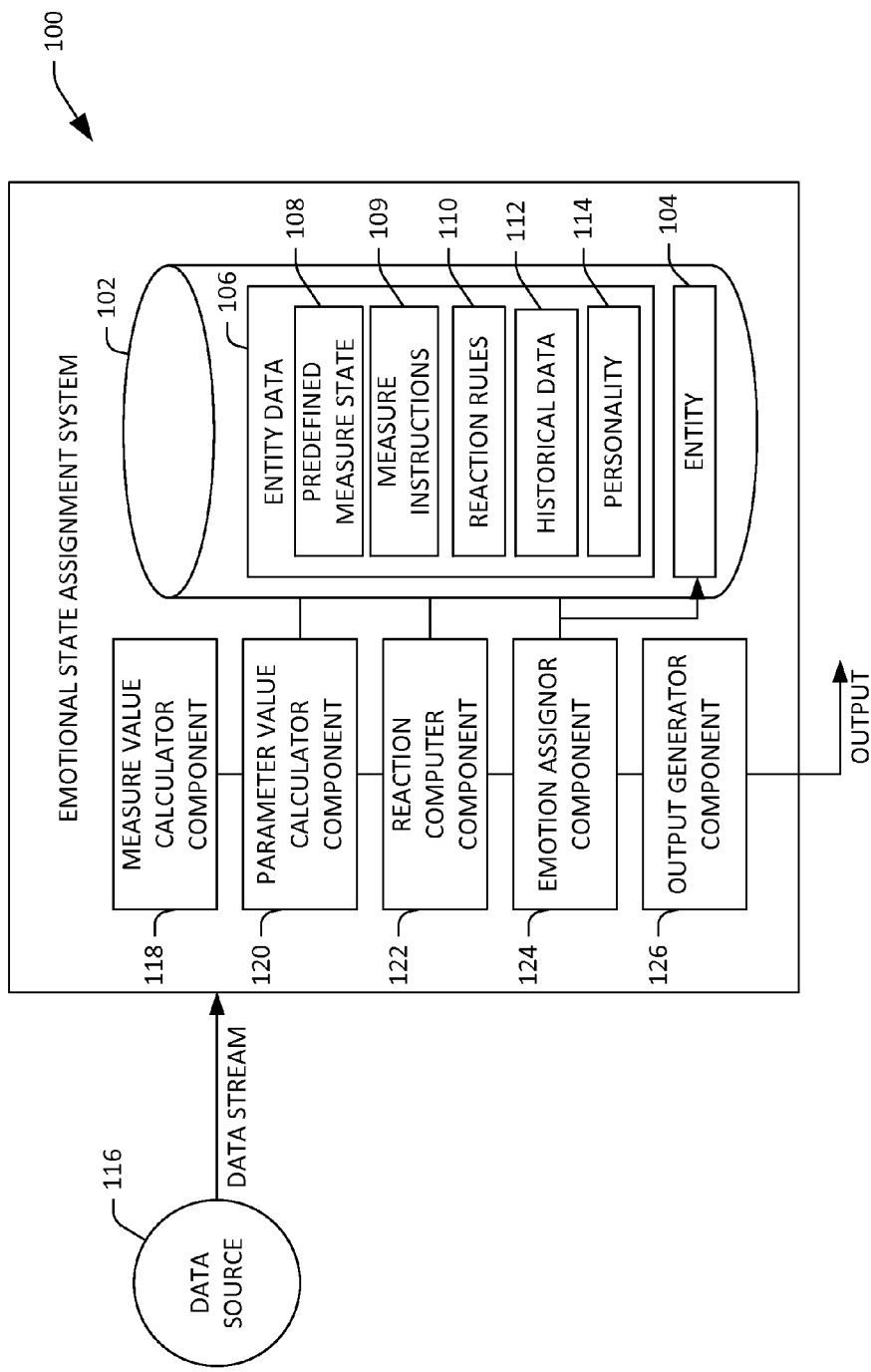
FIG. 1 is a functional block diagram of an exemplary system that facilitates assigning an emotional state to a computer-implemented entity based upon a data stream output by a data source.

Various technologies pertaining to assignment of emotional states to a computer-implemented entity are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to the dynamic assignment of emotional states to a computer-implemented entity over time, wherein such assignment is a function of values in a data stream output by a data source. A readily ascertainable advantage of such technologies is that a human can intuitively understand emotional states expressed by a computer-implemented entity (e.g., responsive to being assigned the emotional states), and therefore the human can empathize with the computer-implemented entity and/or react appropriately responsive to ascertaining that the computer-implemented entity is expressing a particular emotion.

As will be set forth in greater detail herein, emotional states can be dynamically assigned to a computer-implemented entity based upon "measure values" of a "measure". A "measure" is a combination of: 1) a data stream output by a data source; and 2) "measure instructions". The measure instructions define how data values in the data stream are to be processed to compute a measure value. It can therefore be ascertained that multiple "measures" can be based upon a single data stream. A predefined "measure state" is a reference state for the measure with respect to the computer-implemented entity; for example, the predefined measure state can represent an optimal (desired) measure state for the computer-implemented entity. Thus, each measure-computer-implemented entity combination has a respective predefined measure state assigned thereto.

At any instant in time, values for respective "measure parameters" of the measure can be computed, wherein the measure parameters are descriptive of the dynamic state of the measure relative to the predefined measure state. In an example, a measure can have three measure parameters at any instant in time: 1) a first measure parameter that is indicative of a position of the measure relative to the predefined measure state; 2) a second measure parameter that is indicative of direction of movement of the measure relative to the predefined measure state; and 3) a third measure parameter that is indicative of rate of the movement of the measure. As will be described in greater detail herein, emotional states can be dynamically assigned to a computer-implemented entity as a function of values of measure parameters.

With reference now to FIG. 1, an exemplary emotional state assignment system 100 that facilitates assignation of an emotional state to a computer-implemented entity based upon data values in a data stream is illustrated. The emotional state assignment system 100 includes a data store 102, wherein the data store 102 comprises a computer-implemented entity 104. The computer-implemented entity 104 can be representative of a real (physical) object or a virtual object. For example, with respect to physical objects, the computer-implemented entity 104 can be representative of a street, a neighborhood, a building, a plant, a person, a country, etc. With respect to virtual objects, the computer-implemented entity 104 can be representative of a concept, an idea, a group, a television program, or the like.

The data store 102 additionally comprises entity data 106, wherein the entity data 106 comprises data and instructions that are employable to determine which emotional state from a plurality of possible emotional states are to be assigned to the computer-implemented entity 104 at any given instant in time. With more particularity, the entity data 106 comprises a predefined measure state 108, which is defined by a designer of the computer-implemented entity 104. As noted above, predefined measure state 108 is a reference state.

The entity data 106 further comprises measure instructions 109, which, as indicated above, define how data values in a data stream are to be processed to compute a measure value (at any given instant in time).

The entity data 106 also includes reaction rules 110, where each reaction rule maps a respective combination of measure parameter values to a respective reaction of the computer-implemented entity. Accordingly, application of a reaction rule from the reaction rules 110 results in output of a particular reaction assigned to the computer-implemented entity 104, wherein the reaction is from amongst a plurality of predefined reactions.

The entity data 106 may further comprise historical data 112, which can include historical measure values, emotional states previously assigned to the computer-implemented entity 104 (and timestamps indicating when such emotional states were assigned to the computer-implemented entity 104), historical reactions of the computer-implemented entity 104, etc.

The entity data 106 additionally optionally includes a customized personality 114 that has been assigned to the computer-implemented entity 104. The customized personality 114 includes mappings between reactions that can be output through application of the reaction rules 110 and respective emotional states that are assignable to the computer-implemented entity 104.

Operation of the emotional state assignment system 100 is now described. The emotional state assignment system 100 receives a data stream output by a data source 116, wherein the data stream comprises data values output over time by the data source 116. As will be described herein, the emotional state assignment system 106 assigns an emotional state to the computer-implemented entity 104 as a function of the data values in the data stream. The data source 116 can be a continuous data source or an event-based data source. A continuous data source is one that outputs discrete, smoothly transitioning values. Examples of a continuous data source include a thermometer, a carbon monoxide sensor, or the like. An event-based data source can be perceived as an incident-reporting data source, where occurrence of an event or events results in the event-based data source producing a data value.

For data values output by an event-based data source, it can be assumed that no events of the kind monitored by the data source 116 occur between data values output by the data source 116. Further, with respect to event-based data sources, two data values having identical time-stamps can be assumed to be additive. For instance, if the event-based data source 116 is a traffic incident reporting system, and outputs: 1) a first report having a timestamp of 8:00 a.m. that indicates that two traffic incidents occurred; and 2) a second report having a timestamp of 8:00 a.m. that indicates that three traffic incidents occurred, the incidents from the two reports can be aggregated to generate a single value of five traffic incidents occurring at 8:00 a.m. In contrast, when the data source 116 is a continuous data source, data values assigned identical timestamps can be averaged, rather than aggregated. From the foregoing, it can be ascertained that the data source 116 can be any suitable data source, including but not limited to a sensor, a computing device, a web service, etc.

The emotional state assignment system 100 includes a measure value calculator component 118 that subscribes to the data stream, and therefore receives data values in the data stream over time. The measure value calculator component 118 can compute, at any given instant in time, a measure value based upon data values in the data stream and the measure instructions 109 in the entity data 106. As noted above, the measure instructions 109 define how the measure value calculator component 118 is to process data values in the data stream to compute the measure value. The measure instructions 109 can include an integration rate and (at least for a data stream output by an event-based data source) a decay rate. With more particularity, rather than analyzing an instantaneous or most recent value in the data stream to compute the measure value, the measure value calculator component 118 integrates data values over time, wherein the amount of integration is defined by the integration rate. This results in smoothing of the data values over time, and further allows for a measure value to be computed for any given instant in time (even if the instant in time does not have a data value assigned thereto).

The integration rate defines the degree that incoming data values in the data stream are averaged over time (e.g., time duration of a time window over which data values are to be averaged). The larger the integration rate (and thus the larger the time window), the greater the smoothing of the data. A designer can choose the integration rate based upon the frequency of data values in the data stream output by the data source 116. For instance, when the data source 116 outputs data values relatively infrequently (e.g., once a day), the designer may wish that the integration rate be relatively large. In contrast, when the data source 116 outputs data values relatively frequently (e.g., once a second), then the designer may select a smaller integration rate.

Further, at least with respect to an event-based data source, the measure instructions 109 can define a decay rate, wherein the measure value calculator component 118 applies the decay rate to data values in the event-based data stream. With more particularity, the decay rate defines how quickly a value in the data stream decays over time, wherein the larger the decay rate, the greater the decay of a data value in the data stream over time. A designer can additionally choose the decay rate as a function of the frequency of output of the data source 116. For instance, a relatively small decay rate can be employed when the data source 116 infrequently outputs data values, while a larger decay can be employed when the data source 116 outputs data more frequently.

The emotional state assignment system 100 further includes a parameter value calculator component 120. The parameter value calculator component 120 computes values for respective measure parameters of the measure based upon: 1) measure values output by the measure value calculator component 120; and 2) the predefined measure state 108 in the entity data 106. As referenced above, the predefined measure state 108 can be a reference state for the computer-implemented entity 104 with respect to the measure. Pursuant to an example, if the computer-implemented entity 104 represents a home and the data source 116 is a carbon monoxide sensor, the predefined measure state 108 can represent acceptable (desired) value(s) of carbon monoxide in the home. For instance, the predefined measure state 108 can define that carbon monoxide levels of 0.9 and below are desired. While the predefined measure state 108 has been defined as being a particular set value or set of values, in another example, the predefined measure state 108 can be a time-dependent function, such that for any particular point in time a reference value can be computed.

The parameters of the measure can be indicative of the dynamic state of the measure relative to the predefined measure state 108. For example, the parameter value calculator component 120 can be configured to compute respective values for three different parameters for a given point in time: 1) a first parameter that is indicative of a position of the measure (for the given point in time) relative to the predefined measure state 108 (e.g., the position of the measure value for the given point in time relative to the predefined measure state 108); 2) a second parameter that is indicative of direction of movement of the measure relative to the predefined measure state 108 (e.g., the derivative of the measure function represented by measure values in time (e.g., historical data 112); and 3) a rate of the movement of the measure (e.g., the second derivative of the measure function). In an example, possible values for the first parameter can be "FAR ABOVE", "ABOVE", "SLIGHTLY ABOVE", "ON", "SLIGHTLY BELOW", "BELOW", and "FAR BELOW", where "FAR ABOVE" indicates that the measure is "far above" the predefined measure state 108 at the point in time of interest, "ON" indicates that the measure equals or is included in the predefined measure state 108 at the point in time of interest, and so on. Possible values for the second parameter can be "TOWARD", "STEADY", and "AWAY", where "TOWARD" indicates that the measure is moving toward the predefined measure state 108, "STEADY" indicates that the measure is not accelerating or decelerating, and so forth. Possible values for the third parameter can be "VERY FAST", "FAST", "SLOW", "VERY SLOW", and "NONE", where "VERY FAST" indicates that the measure is quickly accelerating or decelerating relative to the predefined measure state 108, "VERY SLOW" indicates that the measure is very slowly accelerating or decelerating relative to the predefined measure state 108, and so forth. In summary, then, the parameter value calculator component 120 computes a dynamic state of the measure relative to the predefined measure state 108.

The emotional state assignment system 100 further comprises a reaction computer component 122 that assigns a reaction to the computer-implemented entity 104 based upon the set of measure parameter values output by the parameter value calculator component 120. With more particularity, the reaction computer component 122 receives the set of measure parameter values output by the parameter value calculator component 120 and selects at least one reaction rule from the reaction rules 110 based upon the set of measure parameter values. As noted above, each reaction rule in the reaction rules 110 can map a respective combination of measure parameter values with a respective reaction (from amongst a plurality of potential reactions) of the computer-implemented entity 104. In an example, the designer may define five reactions: "REACTION 1", "REACTION 2", "REACTION 3", "REACTION 4", and "REACTION 5". The designer may then generate the reaction rules 110, which define mappings between combinations of measure parameter values and reactions. Continuing with the examples set forth above, a first reaction rule can map the combination of measure parameter values "ABOVE", "AWAY", "SLOW" to the reaction "REACTION 1", a second reaction rule can map the combination of measure parameter values "BELOW", "TOWARD", "VERY FAST" to the reaction "REACTION 2", etc. Further, a reaction rule can include inclusion or exclusion relationships for a parameter or between parameters. For instance, the designer can create a reaction rule that maps measure parameter values ("ABOVE" OR "ON"), "STEADY", (NOT "SLOW") to the reaction "REACTION 3". In still another example, the designer can create a reaction rule that maps measure parameter values (NOT "BELOW" AND "TOWARD"), "FAST" to the reaction "REACTION 4".

Furthermore, a reaction rule can be designed to map a combination of the measure parameter values and one or more previous reactions assigned to the computer-implemented entity 104 to a particular reaction. In still yet another example, a reaction rule can be designed to map a combination of the measure parameter values and one or more previous emotional states assigned to the computer-implemented entity 104 to a reaction. Still further, a reaction rule can map a combination of previous emotional state(s), reaction(s), and measure parameter values to a reaction.

The reaction computer component 122 can, based upon the measure parameter values output by the parameter value calculator component 120, search the reaction rules 110 and identify at least one reaction rule in the reaction rules 110 that correspond to the measure parameter values. In some cases, more than one reaction rule may apply, where the different reaction rules map the same set of measure parameter values to different reactions. In such a case, reaction rules in the reaction rules 110 can be assigned respective priority values, where the applicable reaction rule with the higher priority value assigned thereto is selected by the reaction computer component 122. The reaction computer component 122 can assign the reaction designated by the selected reaction rule to the computer-implemented entity 104. Furthermore, in an exemplary embodiment, the reaction can be an emotional state to be assigned to the computer-implemented entity 104; thus the reaction assigned to the computer-implemented entity 104 can be the emotional state. It is therefore to be understood that the use of the customized personality (described below) can be optional.

The emotional state assignment system 100 further includes an emotion assignor component 124 that is in communication with the reaction computer component 122, wherein the emotion assignor component 124 assigns an emotional state (from amongst a plurality of possible emotional states) to the computer-implemented entity 104 responsive to receipt of the reaction output by the reaction computer component 122. With more particularity, the emotion assignor component 124 can assign the emotional state based upon the reaction output by the reaction computer component 122 and the customized personality 114 for the computer-implemented entity 104. As indicated previously, the customized personality 114 maps reactions identified in the reaction rules 110 to respective emotional states. For example, the customized personality 114 can map the reaction "REACTION 1" to the emotional state "HAPPY", can map the reaction "REACTION 2" to the emotional state "UPSET", can map the reaction "REACTION 3" to the emotional state "ANXIOUS", etc.

As can be ascertained, different computer-implemented entities can have different customized personalities assigned thereto, such that a first computer-implemented entity can be assigned a first emotional state when the reaction computer component 122 outputs the reaction "REACTION 1", while a second computer-implemented entity can be assigned a second emotional state for the same reaction. This is analogous to humans, as different humans, having different personality types, have different respective emotional reactions to the same set of circumstances.

Further, in an example, the emotion assignor component 124 can assign the emotional state to the computer-implemented entity 104 based upon the reaction output by the reaction computer component in combination with previous emotional states assigned to the computer-implemented entity 104 and/or emotional states assigned to other computer-implemented entities. This is analogous to human behavior, where an emotional state of a human being is often a function of emotional states of their friends or family and/or their most recent emotional state(s). Accordingly, for instance, the customized personality 114 for the computer-implemented entity 104 can indicate: 1) that a combination of "REACTION 1" with an emotional state "HAPPY" assigned to a second computer-implemented entity maps to the emotional state "HAPPY", and 2) a combination of "REACTION 1" (the same reaction) with an emotional state "WORRIED" assigned to the second computer-implemented entity maps to the emotional state "ANXIOUS".

Responsive to the emotion assignor component 124 assigning the emotional state to the computer-implemented entity 104, for instance, the computer-implemented entity 104 can express particular behavior that is based upon the assigned emotional state. This expression may be in the form of an animation, voice tone, verbal expression (e.g., choice of words and language), or the like. To that end, an output generator component 126 can generate an output based upon the emotional state assigned to the computer-implemented entity 104 by the emotion assignor component 124. In an example, based upon the computer-implemented entity 104 being assigned a particular emotional state, the output generator component 126 can expose the emotional state to a second computer-executable application by way of an application programming interface (API). For instance, the computer-implemented entity 104 can represent a home, and the data source 116 can be a carbon monoxide sensor. When the emotion assignor component 124 assigns the computer-implemented entity 104 the emotional state of "WORRIED", such emotional state can be exposed by way of the API to an alarm application, which in turn can generate an alarm in the form of an e-mail, a voice message, a text message, and/or the like, and transmit the alarm to an end user (human). The human intuitively will understand that the emotion "WORRIED", and can take corrective action accordingly.

It is to be understood that while the emotional state assignment system 100 has been described as assigning the emotional state to the computer-implemented entity 104 based upon a single data stream output by a single data source, the emotional state assignment system 100 can be configured to assign an emotional state to the computer-implemented entity 104 based upon a plurality of different data streams output by respective multiple data sources. For instance, each data source may have a respective predefined measure state included in the data store 102, and the measure value calculator component 118 can compute measure values independently for each of the data sources. Likewise, a single data source may have multiple sets of measure instructions associated therewith, such that multiple measure values can be computed based upon data values from a single data stream (and an emotion can be assigned as a function of the multiple measure values). Thus, the emotional state assignment system 100 can assign an emotional state to the computer-implemented entity based upon numerous measures.

The parameter value calculator component 120 can compute a respective set of measure parameter values for each measure of the numerous measures, and the reaction computer component 122 can compute a single reaction based upon the multiple sets of measure parameter values (e.g., a reaction rule can map combinations of sets of parameter values to a reaction). In another example, the reaction computer component 122 can compute an independent reaction for each measure, such that multiple different reactions can be computed for the computer-implemented entity 104. In such an exemplary embodiment, the customized personality 114 for the computer-implemented entity 104 can map combinations of reactions to respective emotional states. For instance, the combination of reactions "REACTION 1" and "REACTION 3" can map to the emotional state "CONCERNED". Again, this is analogous to human expression of emotion, where human emotion is typically a function of a large number of factors. Still further, measures can be weighted to indicate their influence on the assignation of emotional state to the computer-implemented entity 104. For example, a reaction computed with respect to a first measure may be assigned a larger weight than a reaction computed with respect to a second measure, wherein the customized personality 114 and/or the emotional state assignor component 124 can take into consideration the weights assigned to the measures when assigning the emotional state to the computer-implemented entity 104.

Now referring to FIG. 2, the emotional state assignment system 100 is again illustrated. In the example shown in FIG. 2, the emotional state assignment system 100 is configured to receive N data streams from N respective data sources, and is further configured to assign respective emotional states to three different computer-implemented entities 208-212 based upon data values in data streams output by the data sources 202-206. Additionally, the emotion assignor component 124 can assign emotional states for the respective computer-implemented entities 208-212 as a function of emotional states of other of the computer-implemented entities 208-212. With more particularity, a first emotional state assigned to the first computer-implemented entity 208 can be assigned by the emotion assignor component 124 based upon: 1) a data stream output by at least one of the data sources 202-206; 2) the second emotional state assigned to the second computer-implemented entity 210; and 3) the third emotional state assigned to the third computer-implemented entity 212. Likewise, the emotion assignor component 124 can assign the second emotion to the second computer-implemented entity 210 based upon: 1) a data stream output by at least one of the data sources 202-206; 2) the first emotional state assigned to the first computer-implemented entity 208; and 3) the third emotional state assigned to the third computer-implemented entity 212. Accordingly, FIG. 2 illustrates that emotional state(s) assigned to computer-implemented entities can be a function of multiple data streams from respective multiple different data sources, as well as emotional states expressed by other computer-implemented entities.

Now referring to FIG. 3, an exemplary emotional state design system 300 is illustrated, wherein the emotional state design system 300 can be employed by a designer who wishes to define how a computer-implemented entity expresses emotion based upon data values in a data stream. The emotional state design system 300 includes measure instruction creator component 302 that can be configured to define the measure instructions 109 for an identified data stream and computer-implemented entity. The measure instruction creator component 302 can receive an identity of a computer-implemented entity, as well as an identity of a data source (data stream), wherein the emotional state of the computer-implemented entity 104 is to be a function of data values in the data stream. The measure instruction creator component 302 can further optionally receive threshold values that act as minimum and maximum values for data values in the identified data stream. For instance, if the identified data stream is output of a temperature sensor, the designer may wish to consider temperatures between 40° and 80°. Therefore, a temperature below 40° may be assigned 40°, while a temperature above 80° may be assigned the temperature 80°. The measure instruction creator component 302 can further receive an indication as to whether the identified data stream is continuous or event-based. Finally, the measure instruction creator component 302 can receive a value of the integration rate to be applied to data values in the data stream, and (at least for event-based data streams) can further receive an indication of the decay rate. Responsive to receiving such information, the measure instruction creator component 302 can output the measure instructions 109, which are retained in the data store 102 and employed by the measure value calculator component 118 to compute measure values.

The emotional state designed system 300 can further include a state creator component 304 that can receive input as to a reference state (the predefined measure state 108) for the computer-implemented entity 104 and the measure. In an example, when the computer-implemented entity 104 is representative of a particular geographic region and the data values in the data stream represent crime incidents for the region, the predefined measure state 108 may be on or below two crime incidents (e.g., over a 24-hour window). Accordingly, the output of the state creator component 304 is the predefined measure state 108, which is retained in the data store 102 of the emotional state assignment system 100, and which is utilized by the parameter value calculator component 120 to compute measure parameter values for respective measures.

The emotional state designed system 300 further comprises a reaction rule creator component 306 that facilitates creation of reaction rules (e.g., based upon input received from a designer). The reaction rule creator component 306 can receive combinations of measure parameter values from the designer, and can further receive a defined reaction that is mapped to such combination of measure parameter values. Further, the reaction rule creator component 306 may receive priority information with respect to reaction rules that may potentially conflict. For example, the designer may create a first reaction rule that covers a plurality of different combinations of measure parameter values, and may create a second (more specific) reaction rule that covers a single combination of measure parameter values. In such a situation, the designer may indicate, by way of the reaction rule creator component 306, that the second reaction rule has a higher priority than the first reaction rule, such that when both reaction rules are triggered, the second reaction rule is to be selected by the reaction computer component 122. The output of the reaction rule creator component 306 is the reaction rules 110, which are stored in the data store 102 of the emotional state assignment system 100.

The emotional state design system 300 also includes a personality constructor component 308 that is configured to output the customized personality 114 for the computer-implemented entity 104. As indicated above, the reaction rule creator component 306 maps combinations of measure parameter values to respective reactions. The personality constructor component 308 can map such reactions to respective emotional states. For instance, the designer can input to the personality constructor component 308 that, for the personality type being designed, "REACTION 1" is to map to the emotion "WAVERING", "REACTION 2" is to map to the emotion "JEALOUS", "REACTION 3" is to map to the emotion "CONTEMPTUOUS", and so forth. The emotions can be selected from a predefined list of emotions or can be manually generated by the designer who is using the customized personality type. The output of the personality constructor component 308 is the customized personality 114, which is retained in the data store 102 of the emotional state assignment system 100 and accessed by the emotion assignor component 124 when assigning the emotional state to the computer-implemented entity 104.

Referring now to FIG. 4, an exemplary graphical user interface 400 that can be employed to provide input to the measure instruction creator component 302 is illustrated. The graphical user interface 400 comprises a first field 402 that can be populated by a designer. Data in the first field 402 can identify, for example, a data source from which a data stream is to be received. The graphical user interface 400 may further comprise a second field 404 that can be populated with a value that defines a minimum threshold value for data values in the data stream (identified in the first field 402). The graphical user interface 400 further comprises a third field 406 that is configured to receive a maximum threshold value for data values in the data stream identified in the first field 402.

The graphical user interface 400 may also include a pull-down menu 408 that is configured to receive an indication as to whether the data stream identified in the first field 402 is a continuous data stream or an event-based data stream. A fourth field 410 is configured to receive data that identifies the integration rate to apply to data values in the data stream identified in the first field 402. A fifth field 412 is configured to receive data that identifies the decay rate referenced above. The graphical user interface 400 also includes a button 414 that, when selected, causes the measure instruction creator component 302 to create a set of measure instructions that correspond to the data input into the fields 402, 404, 406, 410, and 412, and input by way of the pull-down menu 408. Optionally, the graphical user interface 400 can illustrate a plurality of previously defined sets of measure instructions (e.g., for the data stream identified in the first field 402 or other data streams). For example, the graphical user interface 400 illustrates five other sets of measure instructions 416-424 previously defined by way of the graphical user interface 400 and the measure instruction creator component 302. Buttons 426-434 allow the designer to delete any one of the measure instructions 416-424.

Figure 5:
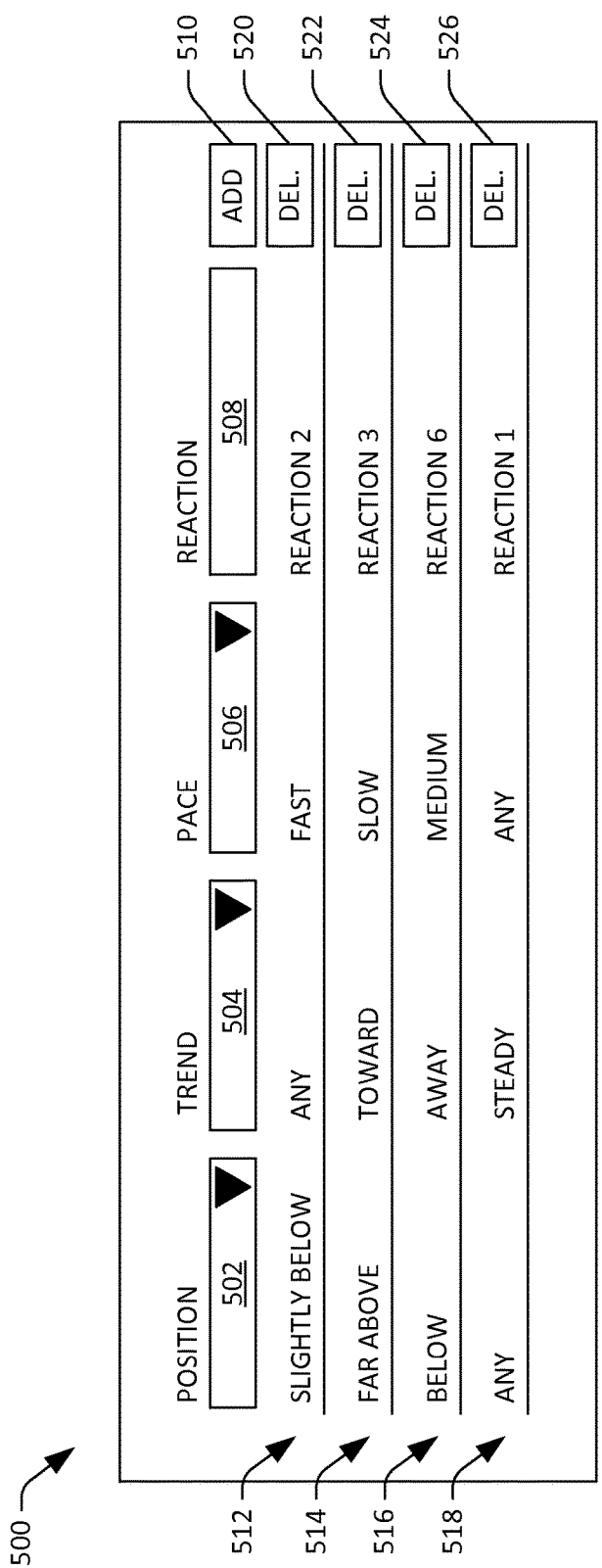
FIG. 5 is an exemplary graphical user interface that facilitates creating reaction rules, wherein a reaction rule maps values of respective parameters to a reaction of a measure.

With reference now to FIG. 5, an exemplary graphical user interface 500 is illustrated, wherein the graphical user interface 500 facilitates provision of input from the designer to the reaction rule creator component 306. As indicated above, a measure value can have a plurality of parameters; a first parameter ("POSITION") that is indicative of position of the measure relative to the predefined measure state 108, a second parameter ("TREND") is indicative of direction of movement of the measure relative to the input state 108, and a third parameter ("PACE") that is indicative of a rate at which the movement is occurring. The graphical user interface 500 comprises a first pull-down menu 502 that, when selected by the designer, illustrates a plurality of potential values for the "POSITION" parameter. Exemplary values for the parameter "POSITION" can include "FAR ABOVE", "ABOVE", "SLIGHTLY ABOVE", "ON", "SLIGHTLY BELOW", "BELOW" and "FAR BELOW". It is to be understood that these labels are exemplary in nature, and are not intended to be limiting.

The graphical user interface 500 further comprises a second pull-down menu that, when selected by the designer, presents a plurality of values for the "TREND" parameter. Exemplary values for the "TREND" parameter displayed in the pull-down menu 504 can include "ANY", "AWAY", "STEADY", and "TOWARD". Again, these values define the direction that measure is moving relative to the predefined measure state 108.

The graphical user interface 500 also includes a third pull-down menu 506 that, when selected by the designer, illustrates a plurality of potential values for the "PACE" parameter. Exemplary values that can be presented when the pull-down menu 506 is selected can include, for example, "FAST", "SLOW", "MEDIUM", and "ANY".

The graphical user interface 500 also includes a field 508 that can be populated by the designer to define a reaction to the combination of parameter values selected by way of the pull-down menus 502-506. For instance, the designer can set forth any suitable name to identify the reaction or can select a reaction from amongst a plurality of predefined reactions. The graphical user interface 500 includes a button 510 that, when selected by the designer, finalizes creation of the reaction rule, and the created reaction rule can be placed in the reaction rules 110. As illustrated, the graphical user interface 500 may also, optionally, illustrate a plurality of previously created reaction rules 512-518 and a plurality of buttons that respectively correspond thereto, wherein the reaction rules 512-518 may be deleted upon the designer selecting the respective buttons 520-526.

Figure 6:
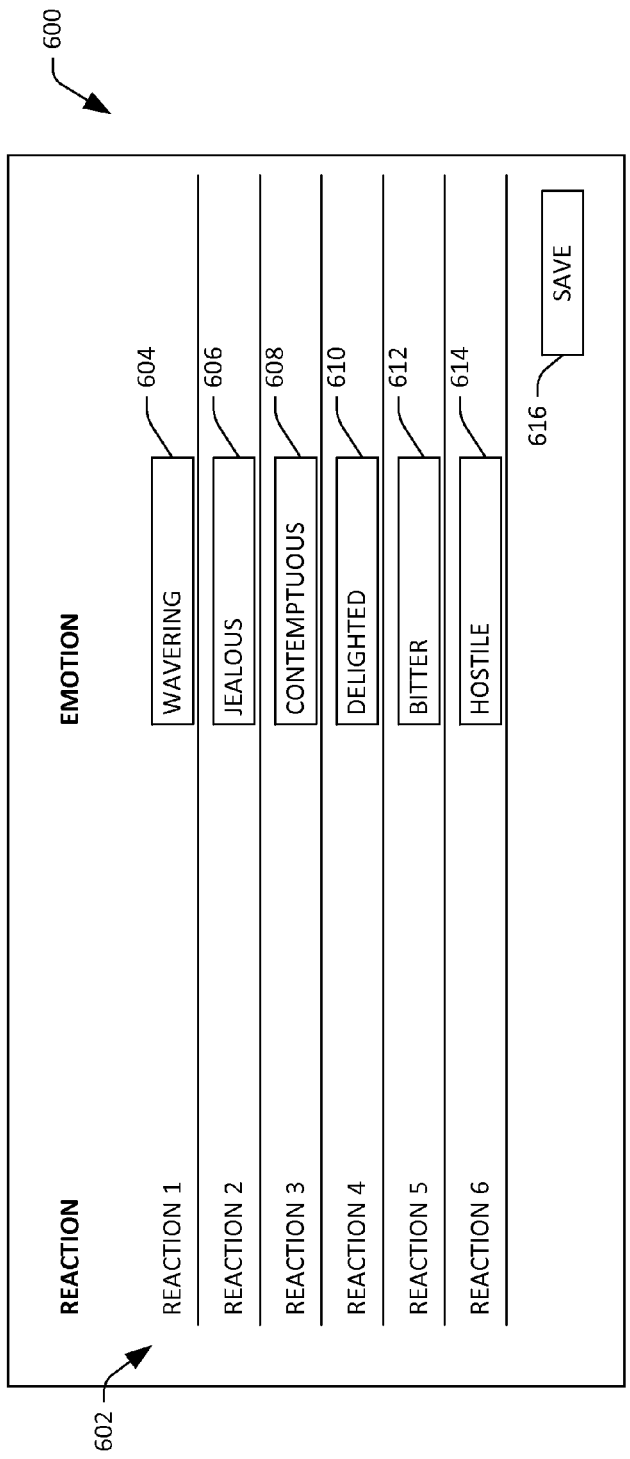
FIG. 6 is an exemplary graphical user interface that facilitates creating a customized personality type, wherein the personality type maps reactions to respective emotional states.

Now referring to FIG. 6, an exemplary graphical user interface 600 that can be employed in connection with creating a customized personality (e.g., personality type) is illustrated. The graphical user interface 600 includes a list of potential reactions (e.g., as defined in the reaction rules 110). For example, the list can include "REACTION 1", "REACTION 2", "REACTION 3", "REACTION 4", "REACTION 5", and "REACTION 6". The graphical user interface 600 further includes a plurality of fields 604-614 that respectively correspond to the six reactions listed in the list of reactions 602. Accordingly, for the personality type defined by way of the graphical user interface 600, the designer can indicate that: "REACTION 1" is mapped to the emotional state "WAVERING"; "REACTION 2" is mapped to the emotional state "JEALOUS"; "REACTION 3" is mapped to the emotional state "CONTEMPTUOUS"; "REACTION 4" is mapped to the emotional state "DELIGHTED"; "REACTION 5" is mapped to the emotional state "BITTER"; and "REACTION 6" is mapped to the emotional state "HOSTILE". Once the personality type is defined as desired by the designer, the designer can select a "SAVE" button 616, which causes the personality type to be saved as the customized personality type 114 in the data store 102.

Figure 7:
FIG. 7 is an exemplary graphical user interface that facilitates defining a predefined (e.g., desired) input state for a measure.

With reference now to FIG. 7, an exemplary graphical user interface 700 that can be employed to define the predefined measure state 108 for a particular measure is illustrated. The graphical user interface 700 includes a pull-down menu 702 that, when selected by the designer, displays previously defined measures. The graphical user interface 700 includes a second pull-down menu 704 that, when selected, illustrates a plurality of constraints that can be assigned to the measure to form the predefined measure state 108. Exemplary constraints that can be illustrated responsive to the designer selecting the pull-down menu 704 include "ON", "ON OR BELOW", "ON OR ABOVE", "BELOW", and "ABOVE". A field 706 can be populated with a goal value. The value entered by the designer into the field 706 together with the selected constraint defines the predefined measure state 108 that is used by the parameter value calculator component 120 to determine values for the measure parameters referenced above.

Figure 8:
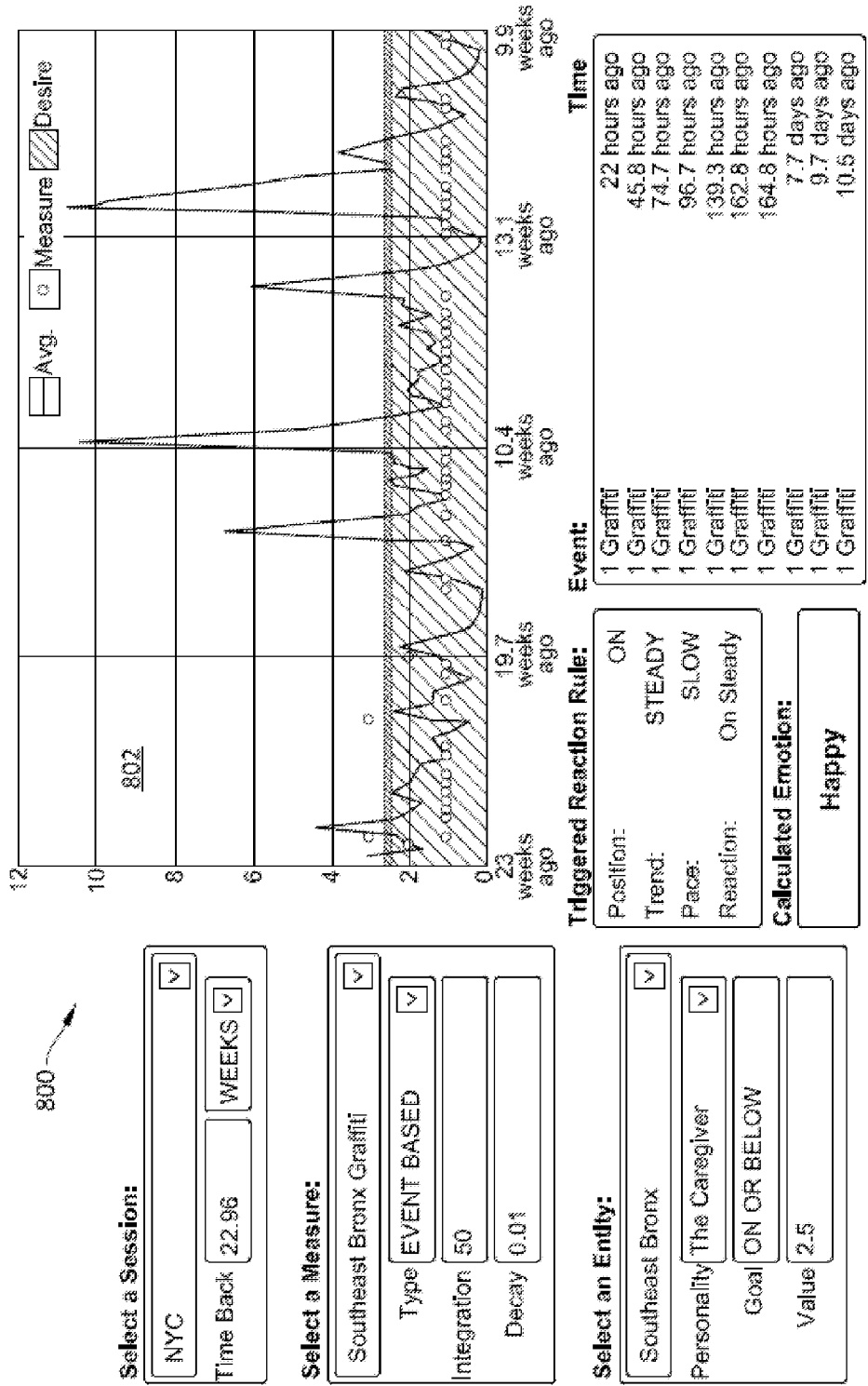
FIGS. 8 and 9 depict exemplary graphical user interfaces for illustrating emotional states assigned to a computer-implemented entity over time.
Figure 9:
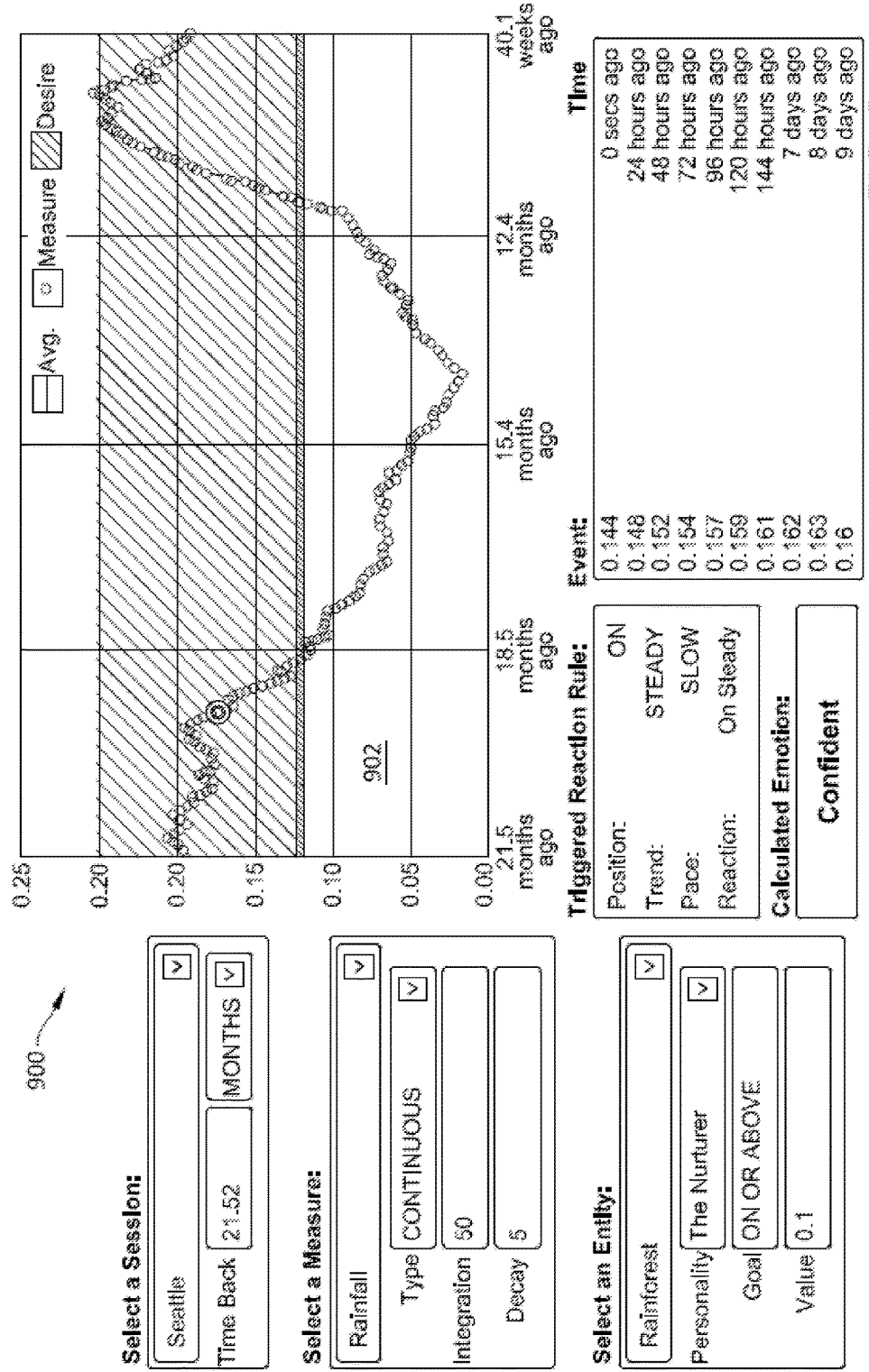

Referring to FIGS. 8 and 9, exemplary graphical user interfaces 800 and 900 that depict assigned emotional states over time are shown. Referring first to FIG. 8, a visualization of the emotional states assigned to the computer-implemented entity "SOUTHEAST BRONX" over a period of 23 weeks is illustrated. The graphical user interface 800 includes a graphical field 802 that illustrates raw data values from the data stream with respect to time, measure values with respect to time, and the predefined measure state. When a position in the graphical field 802 corresponding to a particular point in time is selected, an indication of the measure value for that time, measure parameter values for that time, and emotional state of the computer-implemented entity at that time can be depicted. In another example, an average emotional state of the computer-implemented entity can be presented for the time-frame depicted in the graphical field 802. As can be ascertained, the data stream used to compute the emotional states is an event-based data stream.

Referring to FIG. 9, the graphical user interface 900 illustrates another exemplary visualization of emotional state of a computer-implemented entity over time, wherein the emotional state is based upon a continuous data stream. The graphical user interface 900 includes a graphical field 902 that depicts measure values with respect to time, an average of the data values over the time range depicted in the graphical field, and the predefined measure state. An emotion assigned to the computer-implemented entity for the time range can be presented on the graphical user interface 900. In another example, when a user selects a particular point in time, an emotion assigned to the computer-implemented entity at the particular point in time can be presented in the graphical user interface 900.

Figure 10:
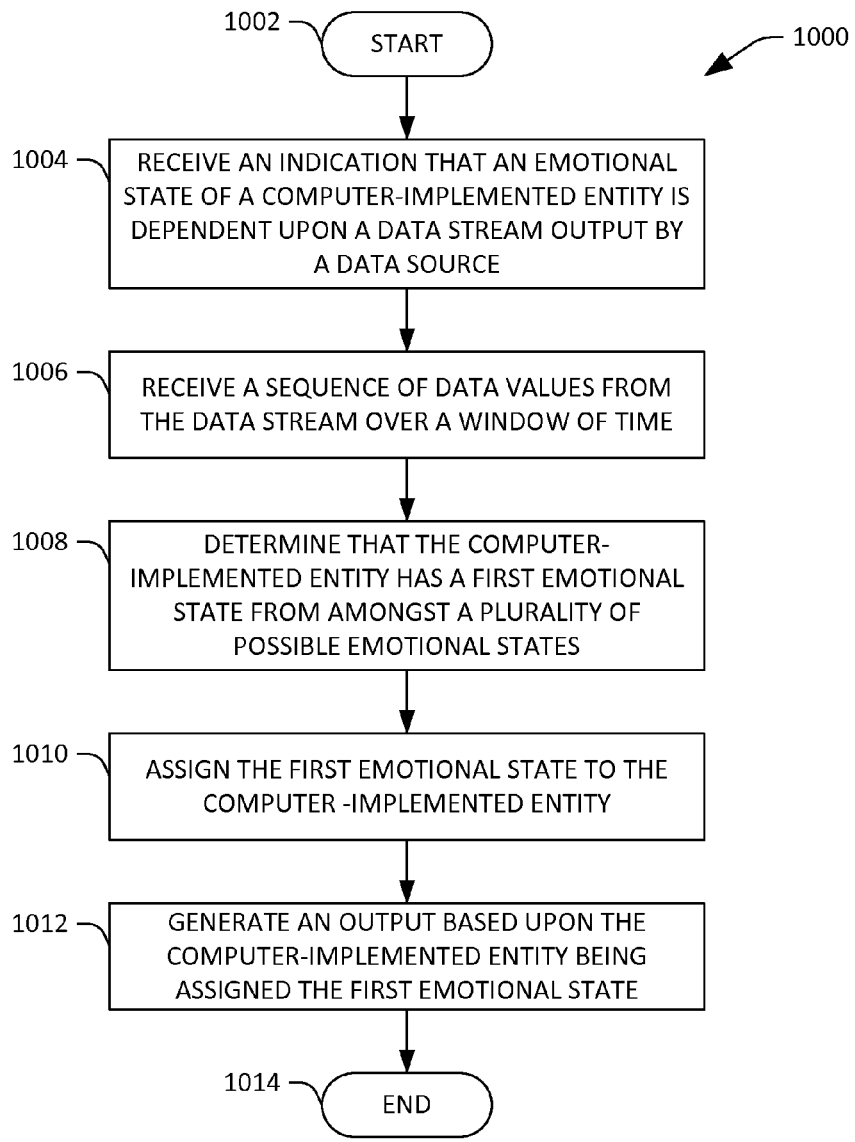
FIG. 10 is a flow diagram that illustrates an exemplary methodology for assigning an emotional state to a computer-implemented entity.
Figure 11:
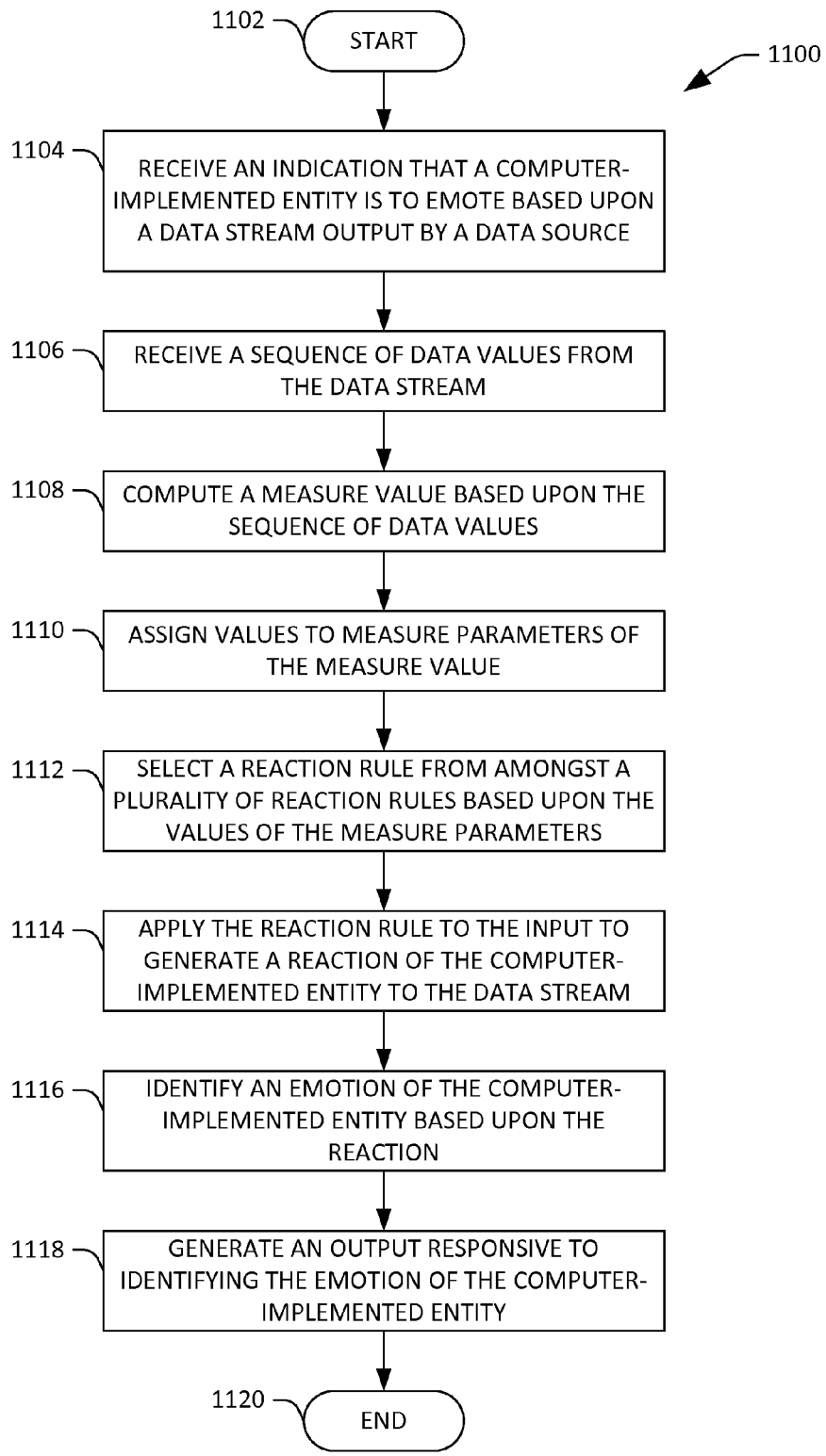
FIG. 11 is a flow diagram that illustrates an exemplary methodology for generating an output based upon an emotion assigned to a computer-implemented entity.
Figure 12:
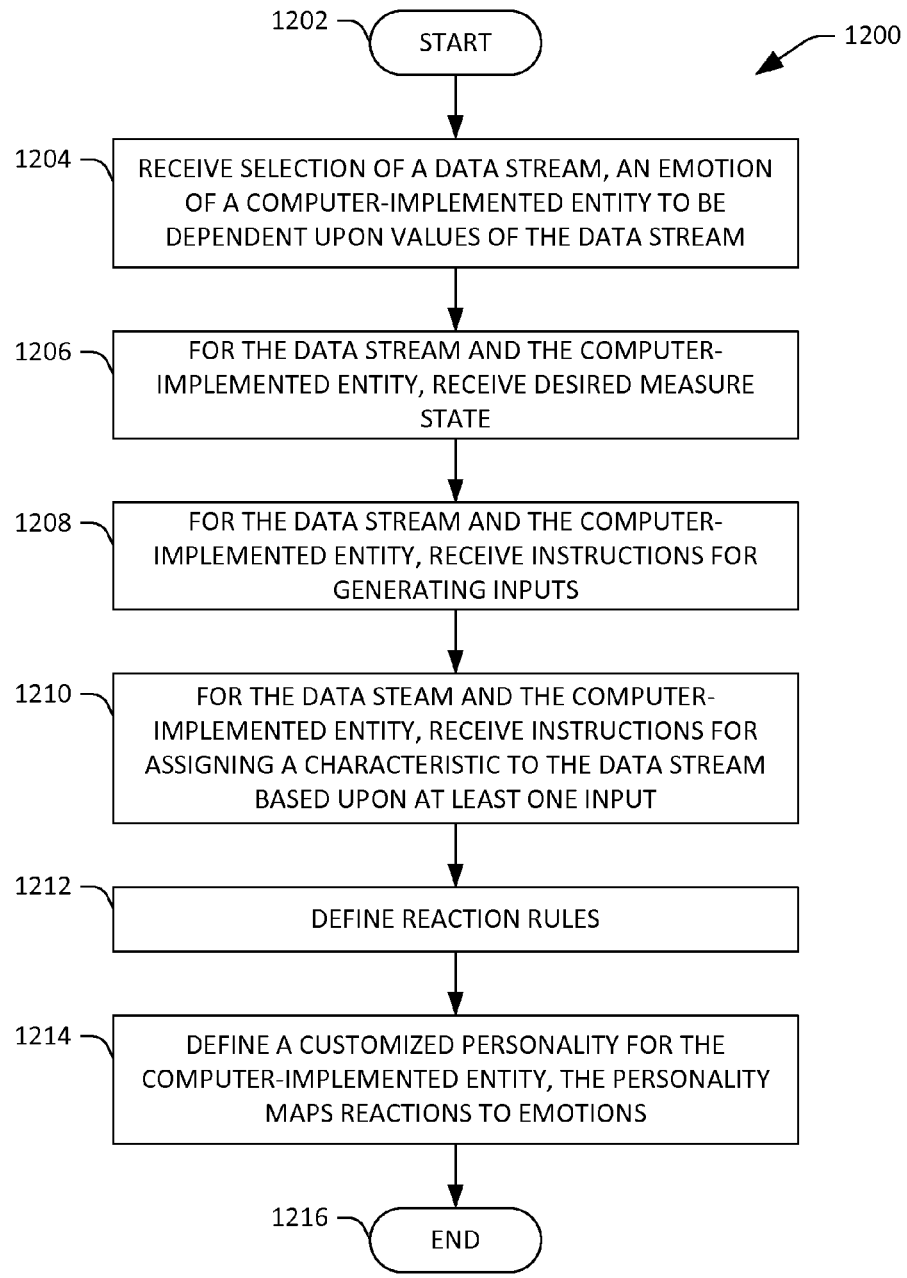
FIG. 12 is a flow diagram that illustrates an exemplary methodology for defining emotional responses of a computer-implemented entity as a function of data values of a data stream.

FIGS. 10-12 illustrate exemplary methodologies relating to assignation of emotional states to computer-implemented entities. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 10, an exemplary methodology 1000 is illustrated. The methodology 1000 starts at 1002, and at 1004, an indication is received that an emotional state of a computer-implemented entity is dependent upon a data stream output by a data source, wherein the computer-implemented entity is assigned a customized personality type.

At 1006, a sequence of data values from the data stream is received over a window of time. The time duration of the window of time can be defined by a designer when creating a measure, wherein the measure can be defined by the data source, the type of data stream, integration rate, and the decay rate.

At 1008, a determination is made that the computer-implemented entity has a first emotional state from amongst a plurality of possible emotional states. Such determination can be based upon the sequence of data values, the time duration of the window of time and the customized personality type of the computer-implemented entity. With more particularity, as described above, a measure value can be computed based upon the data values, the integration rate, and the decay rate. Measure parameter values corresponding for the measure may then be computed based upon the measure value and the predefined measure state. Such measure parameter values can be mapped in a reaction rule to a reaction, which is assigned to the computer-implemented entity. In a customized personality for the computer-implemented entity, the reaction is mapped to the first emotional state.

At 1010, the first emotional state is assigned to the computer-implemented entity responsive to determining that the computer-implemented entity has the first emotional state. At 1012, an output is generated based upon the computer-implemented entity being assigned the first emotional state, and the methodology 1000 completes at 1014.

Now referring to FIG. 11, an exemplary methodology, 1100 that facilitates assigning an emotional state to a computer-implemented entity is illustrated. The methodology 1100 starts 1102, and at 1104, an indication that a computer-implemented entity is to emote is received, wherein the computer-implemented entity emotes based upon a data stream output by a data source. In an example, the data source can be one of a web service or a sensor. Further, the computer-implemented entity has a customized personality that is assigned thereto, wherein the customized personality defines mappings between: 1) reactions of the computer-implemented entity to the dynamic state of measure values; and 2) and respective emotions assignable to the computer-implemented entity.

At 1106, a sequence of data values is received from the data stream. As indicated above, the sequence of data values occurs in a time window that has a time duration. At 1108, a measure value is computed for the data stream based upon the sequence of data values. For example, the measure value can be based upon an average of the data values in the sequence of data values in the time window.

At 1110, responsive to computing the measure value, values are assigned to measure parameters of the measure, wherein the values are based upon the dynamic state of the measure relative to a predefined (desired) measure state, the dynamic state of the measure being indicative of position of the measure relative to the predefined measure state, direction of movement of the measure relative to the predefined measure state, and rate of the movement. At 1112, a reaction rule from amongst the plurality of reaction rules is selected based upon the values of the respective measure parameters assigned at 1110. At 1114, a reaction identified in the reaction rule as mapping to the combination of values of the respective measure parameters is determined, and at 1116, an emotion of the computer-implemented entity is identified based upon the reaction determined at 1114. For example, a mapping of the emotion to the reaction can be defined in the customized personality for the computer-implemented entity.

At 1118, an output is generated responsive to identifying the emotion of the computer-implemented entity. Such output can be a visualization, an e-mail, an alarm or the like. The methodology 1100 completes at 1120.

With reference to FIG. 12, an exemplary methodology 1200 that facilitates defining how a computer-implemented entity will emote based upon data values in a data stream is illustrated. The methodology 1200 starts at 1202, and at 1204, a selection of a data stream is received, wherein an emotion of a computer-implemented entity is dependent upon values of the data stream. For example, a designer can select the data stream from amongst a plurality of available data streams, can subscribe to a web service, etc.

At 1206, for the selected data stream and the computer-implemented entity, a desired measure state is received. For example, the desired measure state can be received by way of the graphical user interface 700 shown in FIG. 7.

At 1208, for the data stream and the computer-implemented entity, instructions for generating measure values based upon the data values in the data stream are received. For example, the instructions can be received by way of the graphical user interface 400 illustrated in FIG. 4.

At 1210, for the data stream and the computer-implemented entity, instructions are received for assigning values to measure parameters of the measure. For example, such instructions can be based upon the desired measure state received at 1206 and a plurality of predefined potential values for the measure parameters.

At 1212, reaction rules are defined, wherein, for example, the reaction rules can be defined by way of the graphical user interface 500 shown in FIG. 5. As indicated above, a reaction rule defines a mapping between a combination of values of respective measure parameters and a reaction.

At 1214, a customized personality type is defined for the computer-implemented entity, wherein the personality maps reactions set forth in the reaction rules with emotions. In an exemplary embodiment, the definition of the customized personality can be received by way of the graphical user interface 600 shown in FIG. 6.

Figure 13:
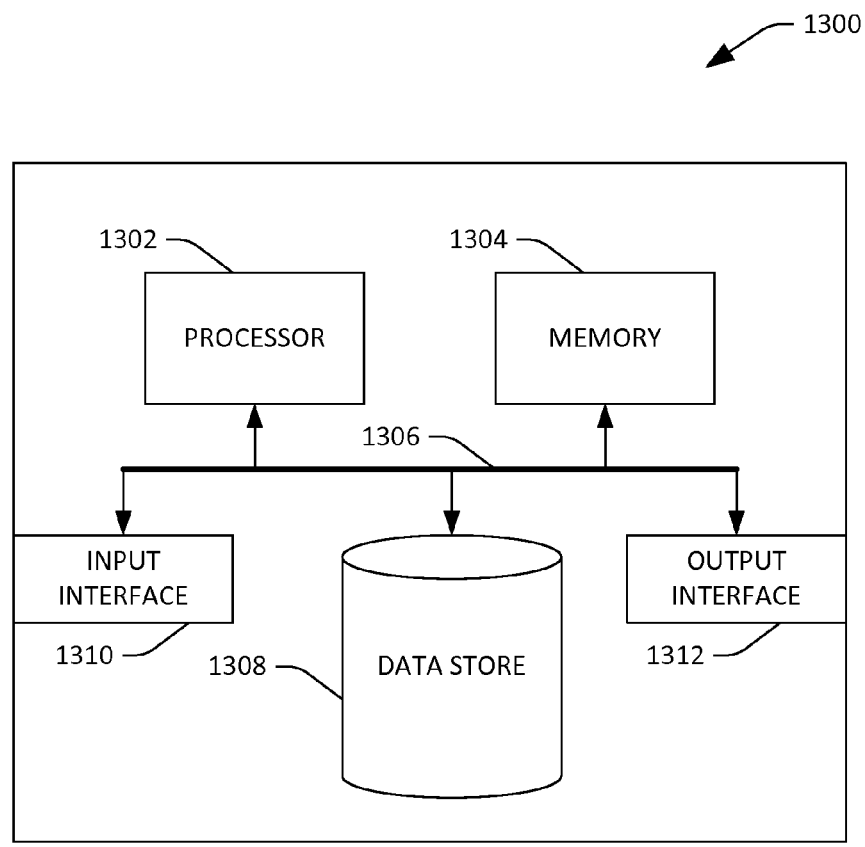
FIG. 13 is an exemplary computing system.

Referring now to FIG. 13, a high-level illustration of an exemplary computing device 1300 that can be used in accordance with the systems and methodologies disclosed herein is illustrated. For instance, the computing device 1300 may be used in a system that supports assigning an emotional state to a computer-implemented entity. By way of another example, the computing device 1300 can be used in a system that is configured to generate measure instructions, define a desired measure state, form reaction rules, or the like. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store customized personality types, reaction rules, a predefined measure state, etc.

The computing device 1300 additionally includes a data store 1308 that is accessible by the processor 1302 by way of the system bus 1306. The data store 1308 may include executable instructions, reaction rules, measure values, data stream values, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

The invention claimed is:

1. A method executed by a processor of a computing system, the method comprising:
   receiving an indication that an emotional state of a computer-implemented entity is dependent upon a data stream output by a data source, the data source being one of a sensor or a computing device, the computer-implemented entity represents a non-human entity, the computer-implemented entity is assigned a customized personality type;
   receiving a sequence of data values from the data stream;
   determining that the computer-implemented entity has a first emotional state from amongst a plurality of possible emotional states, wherein determining that the computer-implemented entity has the first emotional state comprises:
     generating a measure value for the computer-implemented entity based upon the sequence of data values;
     comparing the measure value to a predefined threshold value to ascertain a position of the measure value relative to the predefined threshold value; and
     comparing the measure value to a previous measure value for the computer-implemented entity to ascertain a direction of movement of the measure value relative to the predefined threshold value and a rate of movement of the measure value relative to the predefined threshold value, wherein the first emotional state for the computer-implemented entity is determined based upon the position of the measure relative to the predefined threshold value, the direction of movement of the measure relative to the predefined threshold value, the rate of movement of the measure relative to the predefined threshold, and the customized personality type assigned to the computer-implemented entity;
   assigning the first emotional state to the computer-implemented entity responsive to determining that the computer-implemented entity has the first emotional state; and
   generating a computer-implemented output based upon the computer-implemented entity being assigned the first emotional state rather than another emotional state in the plurality of possible emotional states.

2. The method of claim 1, further comprising:
receiving measure instructions, the measure instructions comprising an integration rate to apply to the sequence of data values, wherein a combination of the measure instructions and the data stream is a measure, wherein generating the measure value comprises integrating the sequence of data values in the data stream based upon the integration rate.

3. The method of claim 2, the measure instructions further comprising a decay rate to apply to individual values in the sequence of data values, and wherein generating the measure value comprises decaying at least one value in the sequence of data values as a function of a timestamp assigned to the at least one value and the decay rate.

4. The method of claim 1, wherein determining that the computer-implemented entity has the first emotional state further comprises:
identifying a reaction rule from a plurality of reaction rules based upon a first value, a second value, and a third value, the first value is representative of the position of the measure value relative to the predefined threshold, the second value is representative of the direction of movement of the measure value relative to the predefined threshold, and the third value is representative of the rate of movement of the measure value relative to the predefined threshold, the reaction rule maps a combination of a) the first value, b) the second value, and c) the third value to a reaction of the computer-implemented entity to the measure from amongst a plurality of predefined reactions.

5. The method of claim 4, wherein determining that the computer-implemented entity has the first emotional state from amongst the plurality of possible emotional states comprises:
accessing the customized personality type responsive to determining the reaction of the computer-implemented entity to the measure, the customized personality type comprises mappings between reactions and respective emotional states; and
determining that the reaction of the computer-implemented entity to the measure is mapped to the first emotional state by the customized personality type.

6. The method of claim 1, further comprising:
receiving an indication that the emotional state of the computer-implemented entity is dependent upon a second data stream output by a second data source;
receiving a second sequence of data values in the second data stream; and
determining that the computer-implemented entity has the first emotional state from amongst the plurality of possible emotional states based upon the second sequence of data values.

7. The method of claim 1, further comprising:
receiving an indication that a second computer-implemented entity has expressed a second emotional state; and
determining that the computer-implemented entity has the first emotional state from amongst the plurality of possible emotional states based upon the indication that the second computer-implemented entity has expressed the second emotional state.

8. The method of claim 1, the computer-implemented entity being representative of a physical entity.

9. The method of claim 1, wherein the data stream is identified as being a continuous data stream rather than an event-based data stream, and wherein determining that the computer-implemented entity has the first emotional state from amongst the plurality of possible emotional states is based upon the data stream being identified as being the continuous data stream.

10. A computing system comprising:
a processor; and
memory that has an emotional state assignment system loaded therein, wherein the emotional state assignment system, when executed by the processor, is configured to:
receive a data stream from a data source, the data source being one of a sensor or a computing device, the data stream comprises a first sequence of values over a first window of time and a second sequence of values over a second window of time that is temporally after the first window of time;
compute a first measure value based upon:
the first sequence of values; and
measure instructions assigned to the data source, the measure instructions defining an amount of integration to be applied when computing measure values, the measure instructions in combination with the data stream defining a measure; compute a second measure value based upon:
the second sequence of values; and
the measure instructions;
assign an emotional state from amongst a plurality of possible emotional states to a computer-implemented entity based upon:
a direction of movement from the first measure value to the second measure value with respect to a predefined measure state; and
a customized personality assigned to the computer-implemented entity, the computer-implemented entity represents a non-human entity; and
generate an output based upon the emotional state assigned to the computer-implemented entity.

11. The computing system of claim 10, wherein the emotional state assignment system, when executed by the processor, is further configured to expose the emotional state assigned to the computer-implemented entity to a computer-implemented communications application.

12. The computing system of claim 10, the emotional state assignment system, when executed by the processor, is further configured to:
compute values that are indicative of a dynamic state of the measure based upon the second measure value; and
assign the emotional state to the computer-implemented entity based upon the values that are indicative of the dynamic state of the measure.

13. The computing system of claim 12, the emotional state assignment system, when executed by the processor, is further configured to:
receive the predefined measure state; and
compute the values that are indicative of the dynamic state of the measure relative to the predefined measure state.

14. The computing system of claim 13, the values that are indicative of the dynamic state of the measure relative to the predefined measure state comprise:
a first value that is indicative of position of the measure relative to the predefined measure state at a particular point in time;
a second value that is indicative of direction of movement of the measure relative to the predefined measure state at the particular point in time; and a third value that is indicative of rate of the movement of the measure.

15. The computing system of claim 12, the emotional state assignment system, when executed by the processor, is further configured to:
   select a reaction rule from amongst a plurality of possible reaction rules based upon the values that are indicative of the dynamic state of the measure relative to the predefined measure state;
   assign a reaction to the computer-implemented entity based upon the reaction being identified in the reaction rule; and
   assign the emotional state from amongst the plurality of possible emotional states to the computer-implemented entity based upon the reaction assigned to the computer-implemented entity.

16. The computing system of claim 15, the customized personality of the computer-implemented entity defines mappings between reactions and respective emotional states, and wherein the customized personality of the computer-implemented entity defines a mapping between the reaction and the emotional state assigned to the computer-implemented entity.

17. The computing system of claim 10, the data source being one of a sensor or a web service.

18. A computer-readable storage medium comprising instructions that, when executed by a processor, cause the processor to perform acts comprising:
   receiving an indication that a computer-implemented entity is to emote based upon a data stream output by a data source, the data source being one of a sensor or a computing device, the computer-implemented entity represents a non-human entity, the data source being one of a web service or a sensor, the computer-implemented entity has a customized personality assigned thereto, the customized personality defines mappings between reactions assignable to the computer-implemented entity and respective emotions assignable to the computer-implemented entity;
   receiving a sequence of data values comprised by the data stream;
   responsive to receiving the sequence of data values, computing a measure value based upon an integration rate defined in measure instructions, the measure instructions in combination with the data stream defining a measure;
   responsive to computing the measure value, assigning a label to the measure that indicates that the measure value is closer to a predefined measure state than a previously computed measure value;
   selecting a reaction rule from amongst a plurality of potential reaction rules based upon the label;
   assigning a reaction identified in the reaction rule to the computer-implemented entity responsive to selecting the reaction rule;
   identifying an emotion of the computer-implemented entity based upon the reaction, the emotion mapped to the reaction in the customized personality of the computer-implemented entity; and
   generating an output responsive to identifying the emotion of the computer-implemented entity.

19. The computer-readable storage medium of claim 18, the acts further comprising:
   receiving an indication that a second computer-implemented entity has been assigned a second emotional state; and
   identifying the motion of the computer-implemented entity based upon the second emotional state assigned to the second computer-implemented entity.

20. The computer-readable storage medium of claim 18, further comprising computing the measure value based upon the data stream being a continuous data stream.

* * * * *